(12) United States Patent
Cox et al.

(10) Patent No.: US 9,683,705 B2
(45) Date of Patent: Jun. 20, 2017

(54) FLOW APPARATUS AND MONITORING SYSTEM RELATING THERETO

(75) Inventors: Michael John Cox, Hertfordshire (GB); John Andrew Golby, Cambridge (GB); Alan Edward Green, Cambridge (GB); Piers Lambert, Surrey (GB)

(73) Assignee: LINDE AKTIENGESELLSCHAFT, Munich (DE)

( * ) Notice: Subject to any disclaimer, the term of this patent is extended or adjusted under 35 U.S.C. 154(b) by 127 days.

(21) Appl. No.: 14/123,369

(22) PCT Filed: May 30, 2012

(86) PCT No.: PCT/GB2012/000477
§ 371 (c)(1),
(2), (4) Date: Feb. 3, 2014

(87) PCT Pub. No.: WO2012/164240
PCT Pub. Date: Dec. 6, 2012

(65) Prior Publication Data
US 2014/0151589 A1    Jun. 5, 2014

(30) Foreign Application Priority Data
Jun. 2, 2011 (GB) .................................. 1109290.5

(51) Int. Cl.
*F16K 37/00* (2006.01)
*F17C 13/02* (2006.01)
(Continued)

(52) U.S. Cl.
CPC .......... *F17C 13/02* (2013.01); *F16K 37/0041* (2013.01); *G01D 5/145* (2013.01); *G01D 5/2492* (2013.01)

(58) Field of Classification Search
CPC ...... G01D 5/2492; G01D 5/145; F17C 13/02; F16K 37/0041
(Continued)

(56) References Cited

U.S. PATENT DOCUMENTS 2,176,338 A * 10/1939 Harrington .................. 200/81.5
3,839,662 A    10/1974 N'Guyen Van et al.
(Continued)

FOREIGN PATENT DOCUMENTS

| CA | 2034844 A1 | 7/1991 |
|----|-----------|--------|
| DE | 19736982 A1 | 8/1998 |

(Continued)

OTHER PUBLICATIONS

International Search Report for PCT/GB2012/000477 dated Nov. 19, 2012.
(Continued)

*Primary Examiner* — John K Fristoe, Jr.
*Assistant Examiner* — Umashankar Venkatesan
(74) *Attorney, Agent, or Firm* — Millen, White, Zelano, Branigan, P.C.

(57) ABSTRACT

The present invention provides a flow apparatus (10) having a flow control valve (12) having a housing (14), an aperture (16), an aperture obturator (18) and an actuator (20) for moving said obturator (16) between a first closed position and multiple open positions (B-L), characterised by a valve position monitor (21) for monitoring the position of the valve (12) and comprising a plurality of discrete sensors (28a to 28e) associated with a plurality of open positions (B-L) of said valve for monitoring the presence or absence of one or more members (26) movable with said valve (12). The arrangement may be used to monitor the valve position
(Continued)

and such monitoring may be of use in the prediction of the amount of fluid remaining within a cylinder (32) to which it has been attached.

28 Claims, 5 Drawing Sheets

(51) Int. Cl.
  *G01D 5/14* (2006.01)
  *G01D 5/249* (2006.01)

(58) Field of Classification Search
  USPC .................. 137/79, 81.1, 557, 551; 251/297
  See application file for complete search history.

(56) References Cited

U.S. PATENT DOCUMENTS

| | | | | |
|---|---|---|---|---|
| 4,277,832 | A | * | 7/1981 | Wong ............................ 700/282 |
| 4,718,638 | A | * | 1/1988 | Phlipot et al. ................ 251/297 |
| 4,924,830 | A | * | 5/1990 | Abe ............................ 73/114.27 |
| 5,057,822 | A | * | 10/1991 | Hoffman ....................... 340/611 |
| 5,099,867 | A | * | 3/1992 | Emery .................. F16K 31/045 137/1 |
| 5,137,052 | A | * | 8/1992 | Baumgart ..................... 137/556 |
| 5,223,822 | A | * | 6/1993 | Stommes et al. ............. 137/551 |
| 5,791,369 | A | * | 8/1998 | Nishino et al. ............... 137/269 |
| 6,098,646 | A | | 8/2000 | Hennemann et al. |
| 6,137,417 | A | * | 10/2000 | McDermott ................... 340/626 |
| 6,184,677 | B1 | * | 2/2001 | Bleckmann et al. .......... 324/166 |
| 6,836,217 | B2 | * | 12/2004 | Andreas ......................... 340/605 |
| 7,190,159 | B2 | * | 3/2007 | Galbreath .............. G01D 5/145 324/207.2 |
| 2002/0111763 | A1 | * | 8/2002 | Koga ............................ 702/151 |
| 2008/0224693 | A1 | * | 9/2008 | Hayashi et al. .......... 324/207.25 |
| 2008/0231266 | A1 | * | 9/2008 | Hayashi et al. .......... 324/207.25 |
| 2010/0229975 | A1 | * | 9/2010 | Sweeney ............... F15B 19/005 137/556 |
| 2012/0293165 | A1 | * | 11/2012 | Zwijze et al. ............ 324/207.11 |
| 2013/0240045 | A1 | * | 9/2013 | Feng ............................... 137/10 |

FOREIGN PATENT DOCUMENTS

| | | |
|---|---|---|
| EP | 0 748 970 A2 | 12/1996 |
| EP | 2110949 A2 | 10/2009 |
| EP | 2 165 770 A1 | 3/2010 |

OTHER PUBLICATIONS

Festo AG & CO KG, "Sensor assembly for recording at least two angle positions of an assembly rotating around a rotation axis," Espacenet, Publication Date: Oct. 21, 2009; English Abstract of EP2110949.

European Search Report for EP 16168210.9-1556, dated Aug. 8, 2016.

\* cited by examiner

FLOW APPARATUS AND MONITORING SYSTEM RELATING THERETO

The present invention relates to a flow apparatus and a monitoring system relating thereto and relates particularly but not exclusively to a fluid flow monitoring apparatus such as a gas cylinder or other vessels containing a fluid under pressure and a monitoring system for ensuring the safe operation thereof.

Presently known gas cylinders usually employ at least one valve to prevent/allow the flow of fluid therefrom and often include two valves, a first acting as a primary on/off valve and a second acting as a flow control valve such as to allow for the adjustment of the rate of flow from the cylinder in accordance with a required or perceived demand. Whilst such valves are generally very reliable, the operation thereof such as to ensure the efficient delivery of gas from the cylinder requires significant skill and the operator is often required to interpret a pressure reading on a Bourdon gauge in order to approximate the amount of time remaining for any set gas delivery rate and to re-calculate the time remaining of a flow-rate is altered. This can be extremely difficult to do and is often beyond inexperienced operators and any errors in the operation of the cylinder valves may result in premature emptying of the gas bottle which can have extremely undesirable results.

Flow control valves can be made to relatively high tolerances and it is possible to determine within an acceptable margin of error the flow rate at any given setting of the valve but it is often difficult to infer a flow-rate from the position of a valve when in use and, thus, errors can still occur. One attempt at solving the problem is discussed in U.S. Pat. No. 6,518,749 B1 which discloses a magnetic position sensor for deriving an electric signal proportional to the position of a mobile portion of a valve arrangement which may then be used for other purposes, which are not discussed within the patent document itself. The arrangement includes a Hall probe which is used to detect a magnetic field strength which is proportional to the valve position. There is no discussion in this document of applying the valve to the control of fluid from a gas container or the like and it, therefore, fails to address the problem tackled by the present invention.

In view of the above, it will be appreciated that the there exists a requirement for a flow apparatus and control system relating thereto which addresses the issue of being able to accurately determine the rate of gas delivery and calculate the time remaining before exhaustion of the remaining fluid supply within a cylinder which does not require an operator to interpret a gauge or calculate an approximate time remaining until exhaustion of the cylinder contents.

The present invention attempts to provide a solution to the above-mentioned problem and, accordingly, provides flow apparatus having a flow control valve having a housing, an aperture, an aperture obturator and an actuator for moving said obturator between a first closed position and multiple open positions, characterised by a valve position monitor for monitoring the position of the valve and comprising a plurality of discrete sensors associated with a plurality of open positions (B-L) of said valve for monitoring the presence or absence of one or more members movable with said valve.

Preferably, the monitor comprises a plurality of members in the form of discrete members positioned for movement in association with the valve and a plurality of discrete sensors fixedly mounted relative to said housing such that movement of the actuator causes said members to move relative to said sensors and allow for detection of said movement through detection of said members by said sensors.

The term "member" is used herein to describe something which forms a target to be detected and possesses a property or emits a signal that can be detected by a suitable sensor, detector or receiver. There are a number of technologies which may be employed including but not limited to: magnetic, inductive, capacitive, optical and physical contact arrangements. Whilst each of these arrangements employs a different physical property in the detection process they all employ the same basic approach of having or transmitting a property or emitting a signal which can be detected by a sensor, detector or receiver and using a suitable sensor, detector or receiver to monitor the presence or absence of said property such as to determine the position of an article, such as the handle of a flow control valve. In view of this, the term "member" is considered to cover each of the above-mentioned arrangements and for the purpose of brevity the term "member" is used throughout this application. For the purposes of brevity the term "sensor" has been used throughout this application in place of the alternatives of detector or receiver. A preferred arrangement which employs magnets which emit a detectable magnetic field is described in detail later herein and each of the alternatives is described briefly such as to allow the skilled reader to appreciate how they may be employed as suitable alternatives.

In one arrangement the valve comprises a rotational valve actuator having a spindle and said members are circumferentially spaced relative to each other and positioned for rotation with said spindle and said sensors are circumferentially spaced around said members. Conveniently, said members may be housed within a handle connected to said spindle.

In a particularly advantageous arrangement the valve includes an indexable (click-stop) multi-position actuator having multiple stop positions A to L and wherein said sensors are positioned adjacent one or more stop positions and are, thus, able to monitor the presence or absence of said members adjacent said stop positions.

Preferably, there are an odd number of members and an even number of sensors. The members may be arranged in two groups ($G_1$, $G_2$), said first group comprising a plurality of members spaced from each other by an amount equal to a spacing $S_1$ between said sensors and said second group ($G_2$) being circumferentially spaced from said first group ($G_1$) by an amount greater than twice the spacing $S_1$ and being circumferentially spaced from each other by an amount equal to twice the spacing $S_1$. When such an arrangement is provided it is preferable if one or more different combinations of the members align with one or more different combinations of sensors associated with at least each of multiple open positions (B to L) of the actuator and preferably each open position and a closed position (A). In one arrangement none of the members align with any of the sensors at a closed position of the valve. Such an arrangement is able to use relatively few members and sensors to monitor a relatively large number of positions.

The apparatus may also include a sensor reader for detecting the presence or absence of an output from each sensor. Additionally, the apparatus may also include an analyser for analysing the outputs sensed by the reader and for determining the position of the valve from said analysis.

Preferably, the apparatus also includes a processor for processing data relating to the position of said valve over time and for calculating the flow rate of fluid through said valve.

In use said apparatus may be positioned on a vessel for receiving a fluid to be dispensed and the processor may be configured for processing data relating to the position of said valve over time and for calculating the flow rate of fluid through said valve and the amount of fluid remaining or the amount of time remaining at the set flow-rate.

Conveniently, the apparatus includes a display for displaying a visual indication of the time remaining before exhaustion of the fluid within the vessel based on a determination of flow rate over time derived from the detection of the valve position.

The members may comprise any one of a number of arrangements but preferably comprise magnetic members and said sensors comprise hall-sensors. An alternative includes an arrangement in which the members comprise transmitter coils for emitting a magnetic field and said sensors comprise coils for generating an eddy current when in the proximity of said emitted magnetic field. In a still further arrangement, said member comprises a light source for transmitting light and said sensors comprise light detectors. Alternatively, said member may comprise a first portion of a capacitive member and said sensor comprises a sensor for sensing a change in capacitance between said first portion and a second portion of said capacitor. In a relatively simple arrangement, said member comprises a protrusion and said sensor comprises a contact sensor positioned to contact with said protrusion when it is in a desired position.

Preferably, the apparatus includes a primary on/off valve or cylinder valve between a cylinder for receiving fluid to be dispensed and said flow control valve and a display for displaying a warning in the event that said primary on/off valve is not fully open.

More accuracy may be possible if the apparatus includes an internal temperature sensor for sensing the temperature of the fluid within a vessel and a temperature transmitter for transmitting a temperature reading to a reader for addition to the valve position data and for use in determining the time before expiry of the contents remaining within the vessel.

Even greater accuracy may be possible if the apparatus includes an internal pressure sensor positioned for determining the pressure within the vessel and a pressure transmitter for transmitting a pressure reading to a reader for addition to the valve position data and for use in determining the time before expiry of the contents remaining within the vessel.

Still further accuracy may be possible if the apparatus includes an external temperature sensor for sensing the ambient temperature and a temperature transmitter for transmitting a temperature reading to a reader for addition to the valve position data and for use in determining the time before expiry of the contents remaining within the vessel.

An additional increase in the accuracy may be possible if the apparatus includes by an external pressure sensor positioned for determining the pressure outside of the vessel and a pressure transmitter for transmitting a pressure reading to a reader for addition to the valve position data and for use in determining the time before expiry of the contents remaining within the vessel.

Preferably, said transmitters comprise magnets and said sensors comprise Hall effect sensors.

In another embodiment the primary on/off valve includes a secondary member and a secondary receiver and a handle portion having a first guide slot provided therein for receiving a first portion of said secondary member, and second guide slot for receiving a second portion of said secondary member, wherein said first guide slot comprises a spiral groove within a surface of said handle portion which extends around an axis of rotation thereof between a first inner position and a second, outer, position and wherein said second guide comprises a radially extending groove extending away from said axis of rotation between a first inner position and a second, outer, position at which said secondary receiver is located, such that, upon rotation of the handle from an off position to an open position the member is caused to slide along both the first and second guides between said inner positions and said outer positions and thus allow said secondary receiver to detect the presence of said secondary member when said primary on/off valve is fully open. Those skilled in the art will appreciate that such a primary valve arrangement may be used independently of the remaining portions of the flow apparatus and that separate claiming of this feature may be contemplated.

In order to reduce power consumption, the control apparatus may be arranged such that the sensors are polled at a given frequency rather than continuously. Further, the apparatus may be configured to have a "sleep mode" in which one or more of the sensors are not used until one or other of the remaining sensors detects movement of the valve away from a closed position. Whilst in such a "sleep mode" the frequency of use of any sensor being used may be reduced, thereby saving even more power.

BRIEF DESCRIPTION OF DRAWINGS

The present invention will now be more particularly described by way of example only with reference to and as illustrated in the accompanying drawings, in which.

Figure 1:
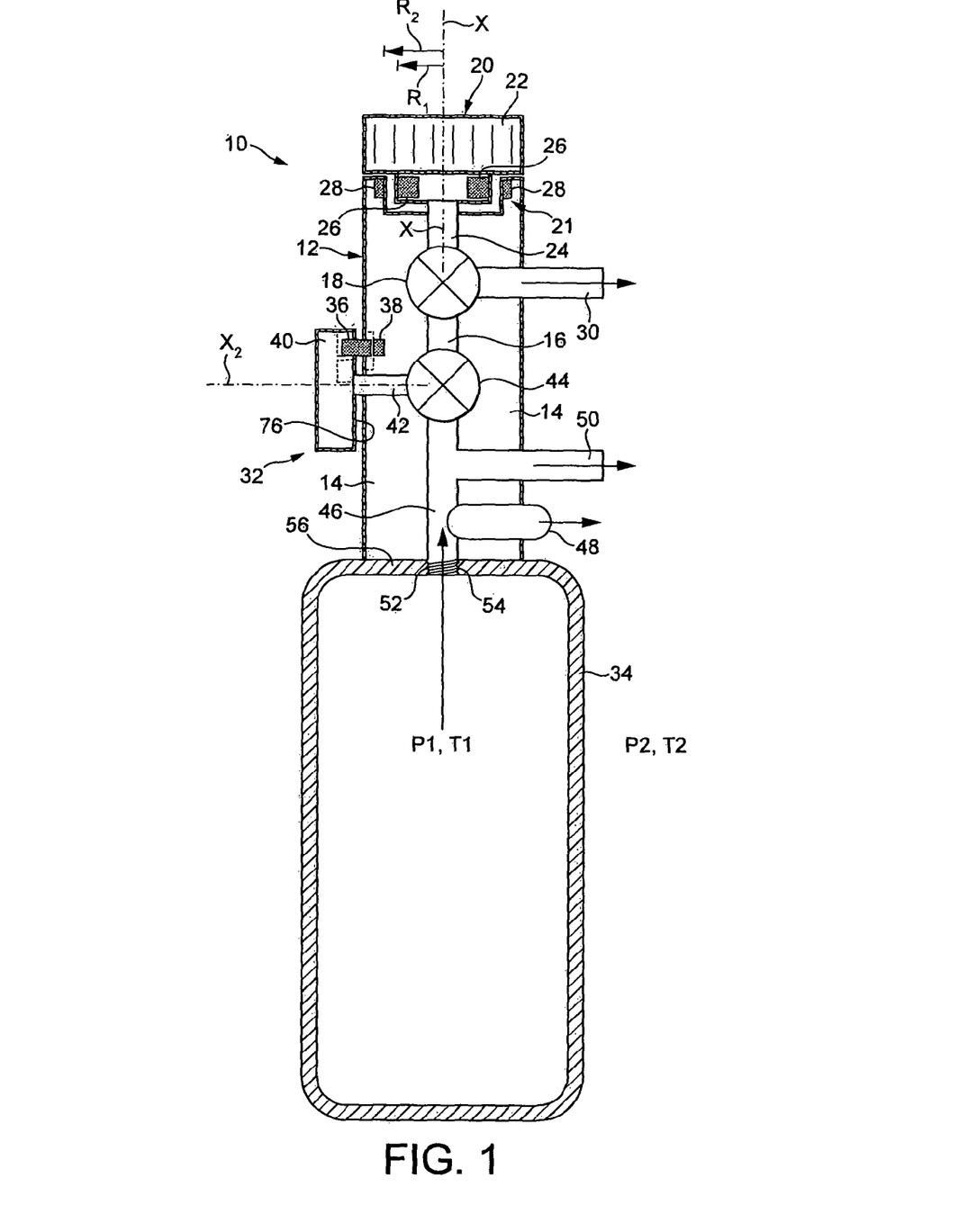
FIG. 1 is a schematic representation of the present invention having a flow control valve in association with a cylinder the contents of which it is desired to monitor.

Referring now to the drawings in general but particularly to FIG. 1, the present invention provides a flow apparatus 10 having a flow control valve 12 having a housing 14, an aperture 16 and an aperture obturator 18. The aperture obturator 18 is coupled for movement with and by an actuator 20 and a valve position monitor, shown generally at 21, is employed to monitor the valve position in a manner to be described later herein. The actuator 20 may comprise a handle 22 connected to a spindle 24 which, in turn, is connected to the obturator 18 such as to allow for opening and closing of the aperture 16 by actuation of the obturator 18 by manual or electro-mechanically initiated movement of the handle 22. The valve 12 has a first closed position A and multiple open positions B to L (FIG. 5), each of which is preferably a pre-selected amount more open than the previous position such as to create a number of discrete open positions, each of which corresponds to a pre-determined or desired flow rate of fluid through the valve itself. A plurality of discrete features 26 provided in association with the moving portions of the valve 12 are monitored such as to determine the valve position as and when required. Whilst it will be appreciated that a number of alternative features such as reflective portions, indents or detents, light members or other such features may be provided on the moving portion, a particularly convenient arrangement comprises a number of members 26a to 26e located at pre-assigned positions within the handle 22 such as to move therewith as the handle is operated. A plurality of discrete sensors 28a to 28d are arranged to be fixedly mounted relative to the housing and adjacent the path of the members 26 as they move between closed and open positions of the valve 12. In the arrangement shown in FIGS. 1 and 2, the members 26 and sensors 28 are each circumferentially spaced at given radii R1 and R2, respectively, around an axis of rotation X of the valve itself and with spindle 24. It will be appreciated that whist the members are shown at the inner radius R1 and the sensors at the greater radius R2 they may be positioned the opposite way around if so desired. It will also be appreciated that whilst the drawing illustrates a rotational valve the invention may also be used in a linear arrangement (not shown) in which the members 26 and sensors 28 are arranged in a linear manner and the member passes over the sensors 28 as the valve is moved between closed and open positions.

Also shown in FIG. 1 is a primary outlet 30 from which controlled fluid will issue upon operation of the valve arrangement and a further valve arrangement shown generally at 32 and upstream of aperture 16. This valve 32 is otherwise known as the primary on/off valve and whilst it is discussed in detail later herein, its function is to allow for the isolation or opening of the cylinder 34 as and when desired such as to cause the fluid contained therein to be allowed to pass to the flow control valve 12 discussed above. This valve is also provides with a member and receiver arrangement shown schematically at 36 and 38 and includes an actuator in the form of, for example, handle 40 and spindle 42 coupled to a second obturator 44 positioned within an inlet 46 of supply conduit 16 and arranged such as to cause the opening or closing of the obturator 44 as and when the handle is moved between open and closed positions. FIG. 1 also illustrates a combined pressure and temperature sensor 48 which is positioned upstream of the primary on/off valve 32 and which terminates within the inlet end 46 of supply conduit 16 such that it is exposed to the pressure and temperature therewithin which is the same as that within the cylinder itself. The detected pressure and temperatures may be used for assisting with the determination of how much gas is within the cylinder, as will be discussed in detail later herein. A secondary outlet 50 is provided between the two valves 12, 32 such as to allow for the supply of fluid for ancillary purposes such as supplying oxygen to a patient. Supply of fluid for ancillary purposes would only be done when the flow control valve 12 is fully closed as to do otherwise would adversely affect the accuracy of the supply of fluid through valve 12. The cylinder 34 and housing 14 are each provided with corresponding screw threads 52, 54 at a neck end 56 of the bottle such as to allow the bottle to be removably connected to the flow apparatus 10 as and when desired.

Figure 2:
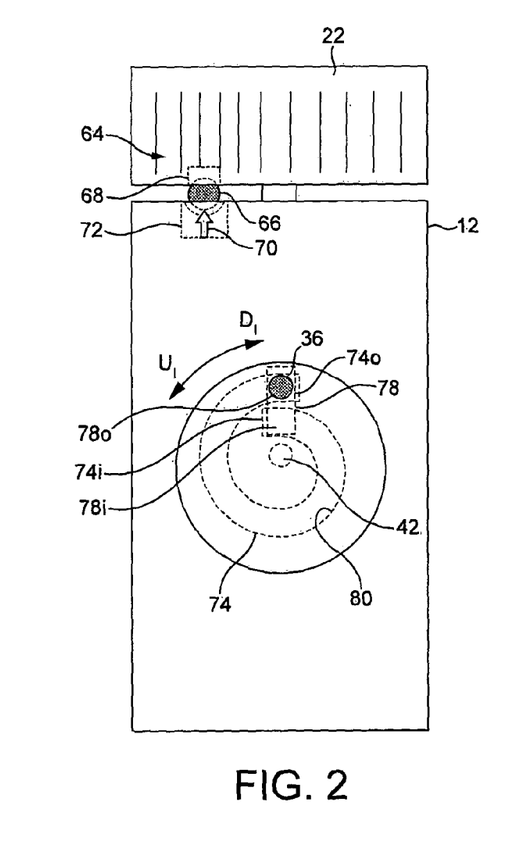
FIG. 2 is an enlarged side elevation of the valve arrangement of FIG. 1.
Figure 3:
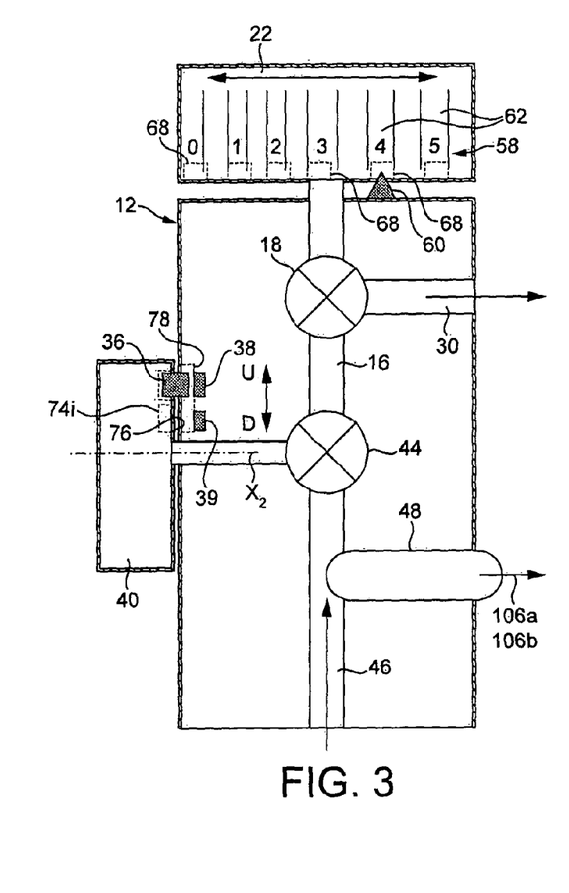
FIG. 3 is a cross-sectional view of the valve taken in the direction of arrows V-V of FIG. 4.

Referring now more particularly to FIGS. 2 and 3, the apparatus 10 further includes an optional visual indicator shown generally at 58 for providing a visual and/or numeric indication of the position of handle 22 and, hence obturator 18. In the arrangement shown, the indicator comprises a marker 60 provided on the valve housing 14 and a series of numbers 62 provided around the circumference of the handle portion 22 and arranged such that, in operation, the numeric value of the numbers aligned with the indicator increases as the obturator 18 is progressively opened. Those skilled in the art will appreciate that other forms of indicator may also be used. The system may be programmed to give an indication of valve position as and when the handle has been indexed to a desired position. This indication may comprise a simple visual indication, such as the display of a reference number corresponding to the actual valve position (1, 2, 3, 4, etc.), which may be displayed on the visual display unit 118 of FIG. 4 or it may comprise an audible indication, or indeed both. In order to assist the user in accurately positioning the handle 22 at the numerically indicated positions, the apparatus 10 preferably further include an indexing or "click-stop" type mechanism represented diagrammatically at 64 and comprising, for example, a ball 66 for being received in a suitably shaped indent 68 within the handle 22 and a spring or force mechanism shown schematically by arrow 70 within hole 72 which, in operation, causes the ball 66 to be biased towards and into the indent 68 such as to provide a resistance to movement of handle 22 and an indication of when the handle is in a desired position. From FIG. 3 it will be appreciated that a series of indents 68 are provided in a circumferentially spaced manner around the handle, each being positioned to correspond with a numerically indicated position of the handle. Operation of the handle 22 would require the operator to exert sufficient force to depress spring 70 and cause ball 66 to be pushed into hole 72 such as to allow handle 22 to ride over said ball. Upon indexing to the next numerically indicated position the user will experience a resistance force associated with the ball 66 being urged into the next adjacent indent 68 and will know the handle 22 is now in the next position. Those skilled in the art will appreciate that other forms of indexing mechanism may also be used.

Also shown in FIGS. 2 and 3 are further details of the primary on/off valve 32 and from which it can be appreciated that the member 36 is housed and floats within a spiral slot 74 provided in the back surface 76 of handle 40 and extends into an opposing and radially extending slot 78 provided in the housing 14. Slot 78 extends away from the axis of rotation $X_2$ of spindle 42. The spiral slot 74 has a first radially inner end 74i opposite a radially inner end 78i of slot 78 and a second radially outer end 74o opposite a radially outer end 78o of said slot 78. A detector 38 is provided within the housing 14 at a point proximate the outer end 78o of slot 78 such as to allow for detection of the member when said member is proximate thereto, as shown in FIG. 2. In operation, the member 36 is caused to move within slots 74 and 78 by simple rotation of handle 40. The interaction between the member 36 and sidewalls 80 of slots 74 and 78 will cause the member 36 to travel up in the direction of arrow U and down in the direction of arrow D upon turning of the handle in directions $U_1$ and $D_1$ respectively, as shown in FIG. 2. It will be appreciated that arranging the obturator 44 such that it is in a fully opened position when the handle is such as to cause the member 26 to be opposite the detector 38 will allow the arrangement to be used to detect the full opening of the primary on/off valve and this may be used for monitoring and warning purposes as discussed in detail later herein. A further detector 39 is positioned opposite the inner portion of spiral 74 such as to allow the detection of the primary valve being in a fully closed position, for reasons that will be explained later herein.

Figure 4:
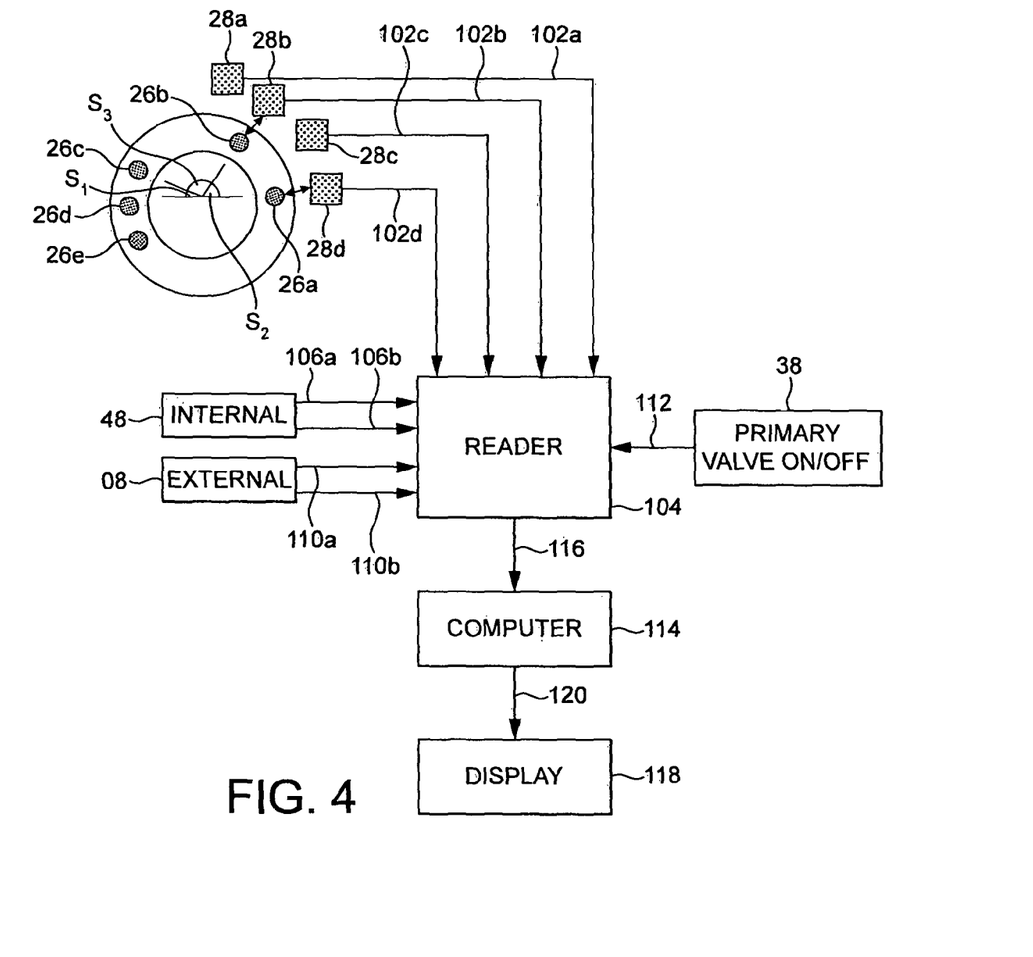
FIG. 4 is a schematic representation of the sensor and computer/display arrangements which form the monitoring system of the present invention.

FIG. 4 illustrates the monitoring system 100 associated with the present invention and its connection to the sensors used for control purposes. It will be appreciated that numerous combinations of numbers of members to sensors could be employed including one sensor for each member, more sensors than members or more members than sensors. However, as many of the members described herein are relatively inexpensive whilst the sensors can be relatively expensive, it has been found that it is advantageous to use an arrangement in which fewer sensors are used than members. The preferred arrangement in which up to twelve valve positions can be detected by just four sensors will now be described in detail. In this arrangement, four sensors 28a to 28d are circumferentially spaced at radius R2 (FIG. 1) and positioned apart from each other by an equal angular spacing $S_1$. A plurality of members 26a to 26e, as discussed in detail above, are provided in two groups $G_1$ and $G_2$ in handle portion 22. The members 22 in the first group $G_1$ are each spaced from each other by an angular amount $S_1$ whilst the members in the second group $G_2$ are each spaced from each other by an angular amount $S_2$ equal to twice $S_1$, for reasons that will become apparent later herein with reference to FIG. 5. Each of groups $G_1$ and $G_2$ are circumferentially angularly spaced from each other by an angular amount $S_3$ greater than twice $S_1$. Each of the sensors 28a to 28d are connected by communication lines 102a to 102d to a reader 104 such as to allow the transmission of a signal indicative of the detection of a member adjacent thereto. The reader 104 is also connected via communication lines 106a and 106b to sensor 48 for receiving a signal indicative of the internal pressure P1 and temperature T1 within the cylinder 34. An optional external sensor 108 may be provided for determining the ambient pressure P2 and temperature T2 and communication lines 110a and 110b may be provided to transmit a signal indicative of the detected values to the reader 104. The sensor 38 associated with the primary on/off valve 32 is also connected by a communication line 112 for the transmission of a signal there to upon detection of the presence of member 36 which is indicative of the valve being fully open. A computer/analyzer shown at 114 and coupled to the reader 104 by communication line 116 is provided for analyzing the received signals and data and for processing them in a manner to be discussed later herein before displaying an output on a display panel 118 connected to the computer for receiving a display signal via communication line 120.

As discussed above, it will appreciate that any one of a number of member and sensor arrangements could be used including but not limited to magnetic, inductive, capacitive, optical and physical contact arrangements. An inductive arrangement would comprise a member having transmitter coils for emitting a magnetic field and said sensors 28 would comprise coils for generating an eddy current when in the proximity of said emitted magnetic field. In a capacitive arrangement, said member (26) would comprise a first portion of a capacitive member and would be movable relative to a second portion of a capacitive member and said sensor 28 would comprise a sensor for sensing a change in capacitance between said first portion and a second portion of said capacitor. In an optical arrangement said member 26 would comprise a light source, such as an LED, for transmitting light and said sensors 28 would comprise a light detector. In a physical contact arrangement the member 26 would comprises a protrusion or indent and said sensor 28 would comprise a contact sensor positioned to contact with said protrusion when it is in a desired position.

Figure 5:
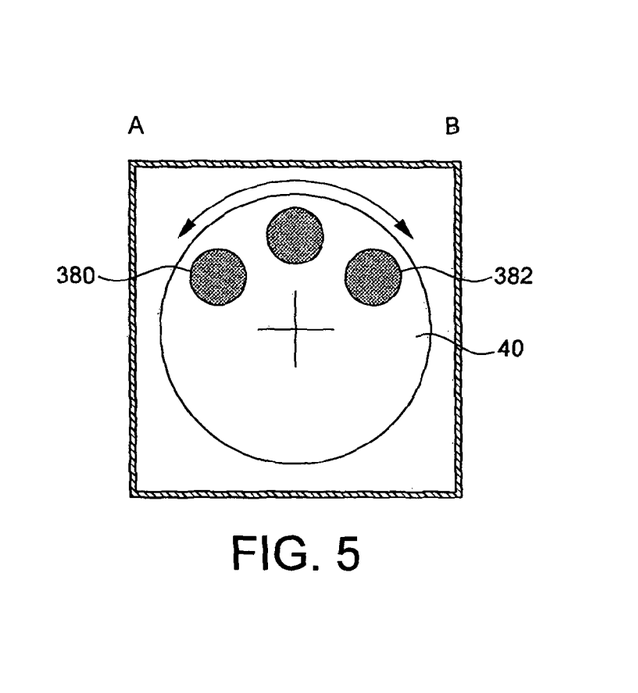
FIGS. 5 and 6 are diagrammatic representations of a simpler primary on/off valve.
Figure 6:
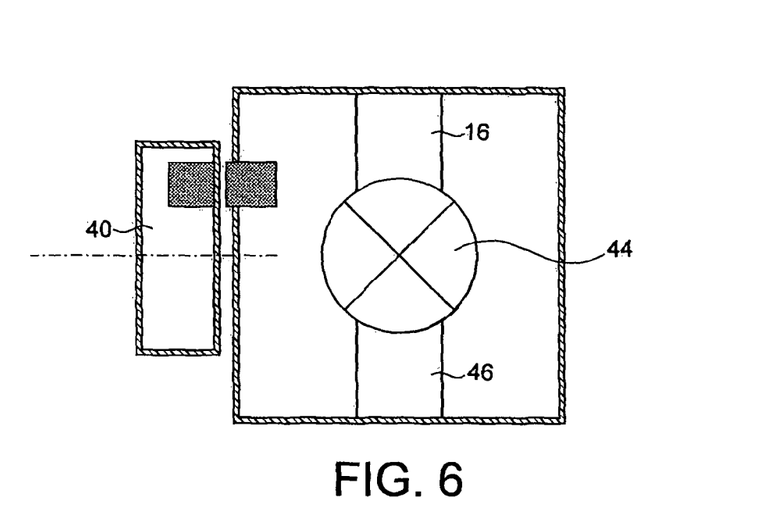

In addition to the above alternatives, one may employ alternative forms of the primary on-off valve 32 and one such alternative is shown in FIGS. 5 and 6. This alternative comprises a simpler arrangement in which a single member 36 is provided in the handle portion 40 and the handle is movable between two positions A and B, less than 360 degrees apart. The degree of separation may be varied between the minimum, such as the angular displacement taken clockwise between A and B or the larger angular displacement taken clockwise between B and A. In such an arrangement, the single member 36 is matched against a pair of detectors 380 and 382 provided at each of the fully open and the fully closed positions of the valve and the arrangement is such that the member 36 takes up a position opposite said appropriate detectors when fully open or fully closed respectively.

Figure 7:
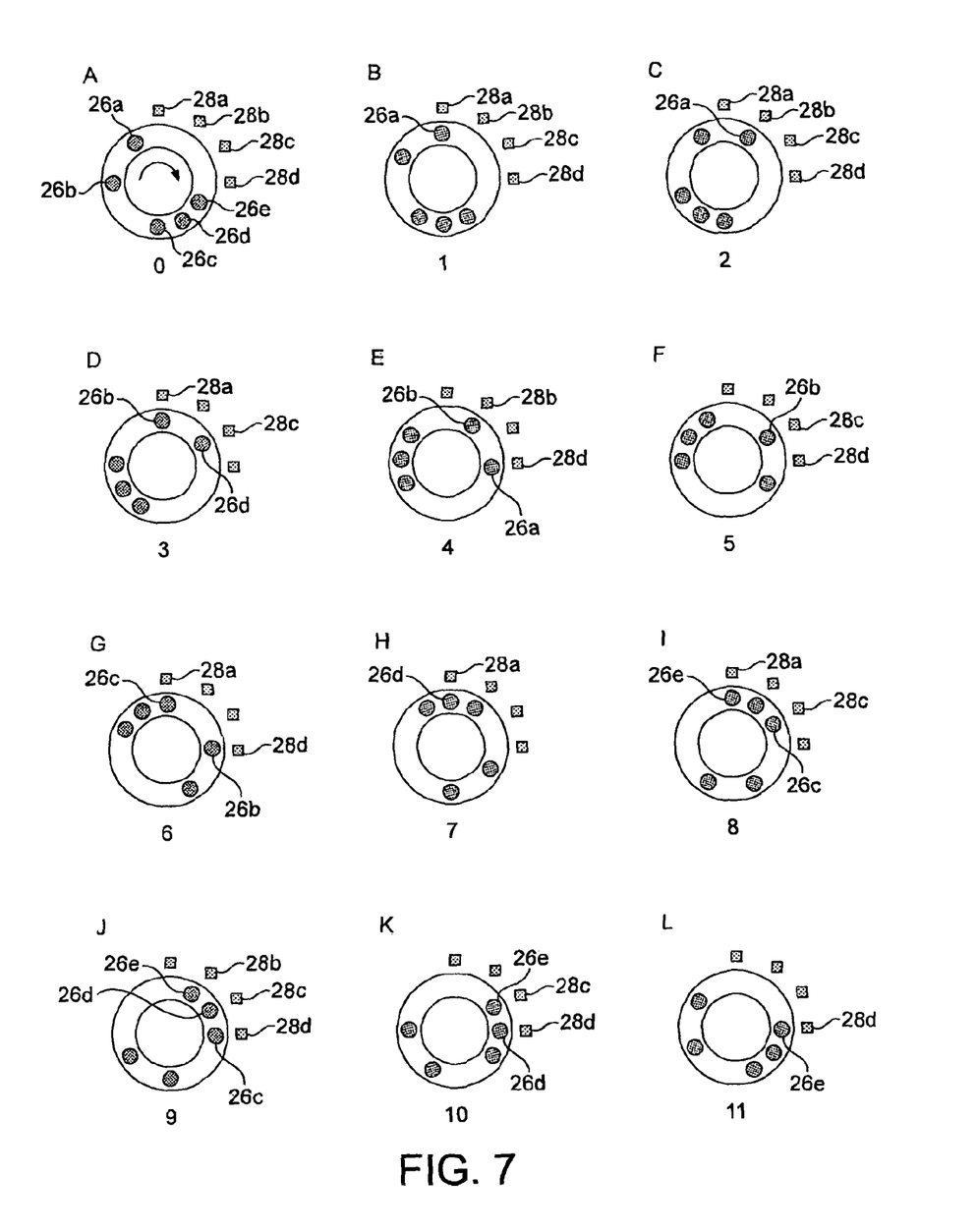
FIG. 7 is a schematic representation of the various valve positions and illustrates the interaction of the members with the sensors in each valve position.

The operation of the above will now be described with reference to the drawings in general but particularly with reference to FIG. 7 which is a diagrammatic representation of the valve 12 in a number of positions from fully closed (position A) to fully open (position L). These positions correspond to reference numbers 0 to 12 on handle 22 of FIG. 3 aligning with marker 60. In position A, the members 26 are each displaced from the sensors 28 and, thus, the sensors are unable to detect any members and unable to transmit any signal to the reader 104. In the absence of a signal the computer will determine that the valve is closed as all other positions allow one or more of the sensors 28 to detect one or more of the members 26. In position B, which corresponds to position 1 on handle 22, member 26a is adjacent sensor 28a which detects its presence and transmits a signal via line 102a to reader 104 which passes that to the computer 114 which is able to review the received data and compare it with a look-up table or other such reference to determine that the valve is in a first of a number of open positions and from which it can derive a potential flow-rate of fluid from the cylinder 34. As the valve is turned further it will pass multiple points represented by positions C to L in FIG. 5 and at each position a different combination of one or more members 26a to 26e align(s) with one or more sensors 28a to 28d such as to allow the reader to receive a signal indicative of valve position and the computer to derive the valve position and derive or infer a potential flow-rate from the cylinder. Such an inferred flow-rate will be subject to the tolerance within which the valve is built but may, within reason, be considered to be sufficiently accurate to allow for the inference of a flow rate. In the interest of brevity the description of which members are before which sensors in which valve positions is represented in the table below and from which the reader will appreciate that a relatively small number of members and receivers is able to determine multiple positions of the valve. In this particular arrangement an even number of four readers is matched with an odd number of five members and is able to monitor some twelve valve positions from closed to fully open. It will be appreciated that it will be possible to monitor many more positions by the simple addition of one or more sensors 28 positioned at a point around the circumference which is not already provided for with a sensor such as to supplement the number of reading positions.

| POSITION | ALIGNMENT 1 | ALIGNMENT 2 | ALIGNMENT 3 |
|---|---|---|---|
| A (CLOSED) | NONE | NONE | NONE |
| B | 26a and 28a | | |
| C | 26a and 28b | | |
| D | 26a and 28c | 26b and 28a | |
| E | 26a and 28d | 26b and 28b | |
| F | 26b and 28c | | |
| G | 26b and 28d | 26c and 28a | |
| H | 26d and 28a | | |
| I | 26c and 28c | 26d and 28b | 26e and 28a |
| J | 26c and 28d | 26d and 28c | 26e and 28b |
| K | 26d and 28d | 26e and 28c | |
| L (FULLY OPEN) | 26e and 28d | | |

Whilst it will be appreciated that all the sensors may be live all the time and, therefore, able to detect or sense valve movement immediately, they may be operated at intervals such as to reduce power consumption. In the interval mode of operation, the sensors may be polled or interrogated or activated at a given frequency and for a very short duration which has the advantage of reducing the overall power consumption as the sensors are not consuming power for much of the time. Variation of the frequency of polling and the duration of activation may further assist with the reduction of power.

It will be appreciated that, in the above, detection of the closed position of the valve (position 0) is detected by the absence of any detection of a magnet by any of the sensors. Whilst this is acceptable for most applications of the technology, it has been found that there are further advantages associated with using one of the positions to positively detect the closed state. Such an alternative arrangement will allow for a greater degree of certainty that the valve is fully closed and would also allow for the sensors to be put in a "sleep" mode when the valve is closed which allows for the reduction in power consumption, as will be detailed later herein. In this alternative arrangement position F of FIG. 7 is employed as the valve closed position and the closed state is detected by sensor 28c alone being adjacent a magnet, all other magnets being clear of all other sensors at this valve position. Movement away from the closed position F would be towards position G (slightly open), at which point sensor 28a would detect magnet 26a and allow the system to be woken from its "sleep" mode. It will be appreciated that the valve may be moved between positions only as quickly as an operator can turn it and, consequently, the fact that there are three magnets 26c, 26d, 26e that must pass sensor 28a during the very first movement of the valve will allow sensor 28a to detect any one or more magnets in order to wake the system from its "sleep" mode. The fact that there is a finite amount of time that it will take an operator to move the valve from the closed position F and the fact that there three magnets will pass by sensor 28a during the initial opening of the valve means that so long as sensor 28a is interrogated or "polled" sufficiently frequently one may easily use it to detect opening of the valve and this detection may be used to awaken all the other sensors which is done by recommencing polling of them too. In effect, when the valve is detected as being in a closed state (F) one does not need to interrogate the sensors continuously or as frequently as it is unlikely that the valve will be operated soon. Consequently, sensors 28b, 28s and 28d may be "turned-off" in as much as the system does not poll them at all when the valve is detected as being in its closed position (F) and are only "turned-on" again by recommencing polling thereof after sensor 28a detects the presence of one or other of magnets 26c, 26d or 26e. Whilst the frequency of polling of the sensors may be varied between different applications, it has been found that by "turning off" non-essential sensors when they are not needed it is possible to significantly reduce the power consumption associated with long-term use of the system by as much as 60%. In addition, as there are three magnets that pass sensor 28a when the valve is first opened, it is also possible to reduce the rate or frequency at which sensor 28a is also polled when "sleep mode" is in operation, thus further reducing the power consumption.

In view of the above, the present system may be programmed such as to adopt a "sleep mode" which comprises turning off or not employing sensors 28b, 28c and 28d when magnet 26b is opposite sensor 28c and has been detected or sensed thereby and re-deploying sensors 28b, 28c and 28d after sensor 28a has detected or sensed one or other of magnets 26c, 26d, 26e which is indicative of the valve having been moved away from a closed position (F). It may still further be programmed to reduce the frequency of interrogation or polling of sensor 28a during any such "sleep mode". In effect, the control apparatus 10 has a sleep mode in which one or more of the sensors are not used until one or other of the remaining sensors detects movement of the valve. Still further, the frequency of use of any sensor being used may be reduced during any sleep mode, thus further reducing power consumption.

The alignments of the sensors and magnets corresponding to this second arrangement are shown below, in which, position F becomes the closed position and position A becomes one of the open positions. In this arrangement the valve is moved form position F to position L (half open) and then onto position E (fully open).

| POSITION | ALIGNMENT 1 | ALIGNMENT 2 | ALIGNMENT 3 |
|---|---|---|---|
| A | NONE | NONE | NONE |
| B | 26a and 28a | | |
| C | 26a and 28b | | |
| D | 26a and 28c | 26b and 28a | |
| E (FULLY OPEN) | 26a and 28d | 26b and 28b | |
| F (CLOSED) | 26b and 28c | | |
| G (SLIGHTLY OPEN) | 26b and 28d | 26c and 28a | |
| H | 26d and 28a | | |
| I | 26c and 28c | 26d and 28b | 26e and 28a |
| J | 26c and 28d | 26d and 28c | 26e and 28b |
| K | 26d and 28d | 26e and 28c | |
| L | 26e and 28d | | |

It will be appreciated that the inference of a flow-rate from the detected valve position and the accuracy thereof is dependent upon a number of external and additional factors, one of which is the position of the primary on/off valve 32 which must be fully open if one is to apply a reasonable inference of flow from the detected positions of the flow control valve 12. In order for this issue to be accommodated the monitoring system further monitors the presence or absence of a signal from sensor 38 which, when present, is indicative of the fully open nature of the primary on/off valve 32. When the reader is in receipt of a signal on line 112 then an inference of flow from the position of valve 12 can be expected to be accurate within given build tolerances and the system is used to infer a flow rate for subsequent use. In the absence of a signal from sensor 38 whilst a signal is being received indicating the flow control valve is open then the computer is programmed to send a warning display to display 118 to alert the operator that the flow rate inference is not to be relied on and the primary on/off vale should be checked.

The main reason for wanting to be able to determine the flow-rate of fluid from the cylinder 34 is to allow the computer 114 to determine or derive a time to exhaustion of the contents of the cylinder such as to allow for such data to be displayed on the display 112 and read by an operator. Whilst knowing the position of the flow control valve 14 is central to this calculation a number of other factors such as the internal pressure $P_1$ and temperature $T_1$ within the cylinder 34 and the ambient pressure $P_2$ and temperature $T_2$ can also play a major role in the accuracy of any derivation. With this in mind, the sensor 48 are employed to monitor $P_1$ and $T_1$ and transmit the data relating thereto via lines 106a and 106b to the reader 104 and thence to the computer 114 where they can be taken into consideration in the derivation process. Additionally, but less importantly, the external pressure $P_2$ and temperature $T_2$ may be taken into consideration if so desired by sensor 108 feeding a signal indicative of P2 and T2 to the reader 104 via lines 110*a* and 110*b* and thence to computer 114 which can take said readings into consideration during any determination.

The main purpose of the display 118 is to provide the operator with a visual and easily interrogated display showing the time remaining for gas supply at the delivery rate derived or inferred from the valve position and any further inputs that may be used. Such a display may include a written or numeric display such as "22 MINUTES REMAINING" and/or an audio communication of the same information. Further warnings such as audio claxon sounds or bell sounds when close to cylinder exhaustion may also be incorporated within the computer 114. The reader will appreciate that the reader 104, computer 114 and display 118 may be combined in one or more articles if so desired. As the accuracy of inference of flow rate through valve 12 is dependent upon ensuring the primary on/off valve 32 is fully open the computer and display may be further programmed to display or produce a further warning in the event that valve 32 is detected as being anything other than fully open. Such a warning may be a visual display such as "CAUTION—FLOW RATE INACCURATE AS PRIMARY VALVE NOT FULLY OPEN" or an audio warning that the displayed flow rate should not be relied on. The system is preferably further programmed to give an audible or visual warning in the event that sensor 39 detects that the primary valve 32 is in its closed position when an operator opens the flow control valve 12, as operation in this manner may give the operator an erroneous impression that gas is flowing—which would not be the case.

As mentioned above will be appreciated that the above inference relies on knowing the flow rate of a given valve at any of the detected positions. Whilst the actual flow rate can be determined by suitable testing on a calibrated flow measuring device it has been found that such valves are now built to a sufficiently high tolerance such as to allow one to simply test one sample manufactured valve and apply the readings therefrom to other valves used in the same arrangement. Tolerances of manufacture can be accommodated by building in a margin of error into the inference step which errs on the side of caution by assuming worst case valve flow conditions and which assumes that more flow is passing through the valve than might actually be the case. In such circumstances the display will display the expiry of the cylinder contents in advance of the actual exhaustion of the cylinder contents. The manufacturing tolerance associated with most valves can be obtained from the manufacturer and this can be provided as an input to the computer for use in the inference process.

The invention claimed is:

1. A flow apparatus (10) for a vessel storing fluid under pressure comprising:
a flow control valve (12) having a housing (14), an aperture (16), an aperture obturator (18), and an actuator (20) for moving said aperture obturator (18) between a first closed position and multiple open positions (A-L),
a valve position monitor (21) for monitoring the position of the valve (12), said monitor (21) comprising a plurality of members (26) movable with said valve (12) and a plurality of discrete sensors (28*a* to 28*d*) associated with a plurality of open positions of said valve (12) for monitoring the presence or absence of said one or more members (26) movable with said valve (12), and
said actuator comprises a handle (22) connected to a spindle (24),
wherein said plurality of said members (26) are in the form of discrete members (26*a* to 26*e*) housed within said handle (22) connected to said spindle (24), and said members move with said handle as said handle is moved, and wherein said plurality of discrete sensors (28*a* to 28*d*) are fixedly mounted relative to said housing (12) such that movement of the actuator (20) causes said members (26) to move relative to said sensors (28) and allow for detection of said movement through detection of said members (26) by said sensors (28*a* to 28*d*).

2. A flow apparatus (10) as claimed in claim 1, wherein said actuator (20) is a rotational valve actuator (20) and said members (26) are circumferentially spaced relative to each other and positioned for rotation with said spindle (24) and said sensors (28) are circumferentially spaced around said members (26).

3. A flow apparatus (10) as claimed in claim 1, wherein said actuator (20) is an indexable (click-stop) multi-position actuator having multiple stop positions and wherein said sensors (28*a* to 28*d*) are positioned adjacent one or more stop positions.

4. A flow apparatus (10) as claimed in claim 1, wherein said monitor (21) has an odd number of said members (26) and an even number of said sensors (28).

5. A flow apparatus (10) as claimed in claim 1, wherein said members (26) are arranged in two groups ($G_1$, $G_2$), said first group ($G_1$) comprising a plurality of magnets spaced from each other by an amount equal to a spacing $S_1$ between said sensors (28), and said second group ($G_2$) being circumferentially spaced from said first group ($G_1$) by an amount greater than twice the spacing $S_1$ and being circumferentially spaced from each other by an amount equal to twice the spacing $S_1$.

6. A flow apparatus (10) as claimed in claim 1, wherein one or more different combinations of said members (26) align with one or more different combinations of said sensors (28) at each of multiple open positions of said actuator (20).

7. A flow apparatus (10) as claimed in claim 1, wherein none of said members (26) align with any of said sensors (28) at a closed position of said valve.

8. A flow apparatus (10) as claimed in claim 1, further comprising a sensor reader (104) which is connected by position transmitters (102*a*-102*d*) to each of said sensors (28) for detecting the presence or absence of an output from each sensor (28).

9. A flow apparatus (10) as claimed in claim 8, further comprising an analyser (114) for analysing outputs sensed by said sensor reader (104), and for determining the position of said valve (12) from the resultant analysis.

10. A flow apparatus (10) as claimed in claim 8, further comprising a processor (114) for processing data relating to the position of said valve (12) over time and for calculating the flow rate of fluid through said valve (12).

11. A flow apparatus (10) as claimed in claim 1, wherein said apparatus (10) is positioned on a vessel (34) for receiving a fluid to be dispensed, and said apparatus (10) further comprises a processor (114) for processing data relating to the position of said valve (12) over time and for calculating the flow rate of fluid through said valve (12) and the amount of fluid remaining or the amount of time remaining at a set flow-rate.

12. A flow apparatus (10) as claimed in claim 11, further comprising a display (118) for displaying a visual indication of the time remaining before exhaustion of fluid within the vessel (34) based on a determination of flow rate over time derived from detection of the valve (12) position.

13. A flow apparatus (10) as claimed in claim 1, wherein said plurality of members (26) comprise magnetic members and said sensors (28) comprise hall effect-sensors.

14. A flow control apparatus (10) as claimed in claim 1, wherein said plurality of members (26) comprise transmitter coils for emitting a magnetic field and said sensors (28) comprise coils for generating an eddy current when in the proximity of said emitted magnetic field.

15. A flow control apparatus (10) as claimed in claim 1, wherein said plurality of members (26) comprise a light source for transmitting light and said sensors (28) comprise light detectors.

16. A flow control apparatus (10) as claimed in claim 1, wherein said plurality of members (26) comprise a first portion of capacitive member and said sensors (28) comprise a sensor for sensing a change in capacitance between said first portion and a second portion of said capacitive member.

17. A flow control apparatus as claimed in claim 1, wherein said plurality of members (26) comprise a protrusion and said sensors (28) comprise a contact sensor positioned to contact said protrusion when it is in a desired position.

18. A flow apparatus (10) as claimed in claim 1, further comprising a primary on/off valve (32) between a cylinder (34) for receiving fluid to be dispensed and said flow control valve (12), and a display (118) for displaying a warning in the event that said primary on/off valve (32) is not fully open.

19. A flow apparatus (10) as claimed claim 8, further comprising an internal temperature sensor (48) for sensing the temperature of fluid within a vessel (34) and a temperature transmitter (106a) for transmitting a temperature reading to said sensor reader (104), in addition to the valve position data transmitted to said sensor reader (104) by position transmitters (102a-102d), for use in determining the time before expiry of the contents remaining within the vessel (34).

20. A flow apparatus (10) as claimed in claim 8, further comprising an internal pressure sensor (48) positioned for determining the pressure within a vessel (34) and a pressure transmitter (106b) for transmitting a pressure reading to said sensor reader (104), in addition to the valve position data transmitted to said sensor reader (104) by position transmitters (102a-102d), for use in determining the time before expiry of the contents remaining within the vessel (34).

21. A flow apparatus (10) as claimed in claim 8, further comprising an external temperature sensor (108) for sensing the ambient temperature and a temperature transmitter (110a) for transmitting a temperature reading to said sensor reader (104), in addition to the valve position data transmitted to said sensor reader (104) by position transmitters (102a-102d), for use in determining the time before expiry of the contents remaining within the vessel (34).

22. A flow apparatus (10) as claimed in claim 8, further comprising an external pressure sensor (108) positioned for determining the pressure outside of a vessel (34) and a pressure transmitter (110b) for transmitting a pressure reading to said sensor reader (104), in addition to the valve position data transmitted to said sensor reader (104) by position transmitters (102a-102d), for use in determining the time before expiry of the contents remaining within the vessel (34).

23. A flow control apparatus (10) as claimed in claim 18, wherein said primary on/off valve (32) includes a secondary member (36), a secondary receiver (38) and a handle portion (40) having a first guide slot (74) provided therein for receiving a first portion of said secondary member (36), and a second guide slot (78) for receiving a second portion of said secondary member (36), wherein said first guide slot (74) comprises a spiral groove within a surface of said handle portion (40) which extends around an axis of rotation $X_2$ thereof between a first inner position ($74_i$) and a second, outer, position ($74_o$) and wherein said second guide (78) comprises a radially extending groove extending away from said axis of rotation $X_2$ between a first inner position ($78i_i$) and a second, outer, position ($78_o$) at which said secondary receiver (38) is located, such that, upon rotation of the handle portion (40) from an off position to an open position said secondary member (36) is caused to slide along both the first and second guides (76,78) between said inner positions (76i, 78i) and said outer positions ($76_o$, $78_o$) and thus allow said secondary receiver (38) to detect the presence of said secondary member (36) when said primary on/off valve is fully open.

24. A flow control apparatus (10) as claimed in claim 1, wherein said sensors (28) are polled at a given frequency.

25. A flow control apparatus (10) as claimed in claim 1, wherein said apparatus has a sleep mode in which one or more of the sensors (28) are not used until one or other of the remaining sensors (28) detects movement of the valve.

26. A flow control apparatus (10) as claimed in claim 25, wherein during any sleep mode the frequency of use of any sensor (28) being used is reduced.

27. A flow apparatus (10) for a vessel storing fluid under pressure comprising:
a flow control valve (12) having a housing (14), an aperture (16), an aperture obturator (18), and an actuator (20) for moving said aperture obturator (18) between a first closed position and multiple open positions (A-L),
a valve position monitor (21) for monitoring the position of the valve (12), said monitor (21) comprising one or more members (26) movable with said valve (12) and a plurality of discrete sensors (28a to 28d) associated with a plurality of open positions of said valve (12) for monitoring the presence or absence of said one or more members (26) movable with said valve (12),
a primary on/off valve (32) between a cylinder (34) for receiving fluid to be dispensed and said flow control valve (12), and
a display (118) for displaying a warning in the event that said primary on/off valve (32) is not fully open.

28. A flow apparatus (10) for a vessel storing fluid under pressure comprising:
a flow control valve (12) having a housing (14), an aperture (16), an aperture obturator (18), and an actuator (20) for moving said aperture obturator (18) between a first closed position and multiple open positions (A-L),
a valve position monitor (21) for monitoring the position of the valve (12), said monitor (21) comprising one or more members (26) movable with said valve (12) and a plurality of discrete sensors (28a to 28d) associated with a plurality of open positions of said valve (12) for monitoring the presence or absence of said one or more members (26) movable with said valve (12), and wherein said apparatus has a sleep mode in which one or more of the sensors (28) are not used until one or other of the remaining sensors (28) detects movement of the valve.

* * * * *